W. A. BARR.

ERASER.

(Application filed Nov. 5, 1897.)

No. 11,682. Reissued July 26, 1898.

Witnesses
John A. Rennie
Guy E. Davis

Inventor:
William A. Barr
By his Attorneys,
Baldwin Davidson & Wright

THE NORRIS PETERS CO., PHOTO-LITHO., WASHINGTON, D. C.

UNITED STATES PATENT OFFICE.

WILLIAM A. BARR, OF WASHINGTON, DISTRICT OF COLUMBIA.

ERASER.

SPECIFICATION forming part of Reissued Letters Patent No. 11,682, dated July 26, 1898.

Original No. 578,190, dated March 2, 1897. Application for reissue filed November 5, 1897. Serial No. 657,582.

*To all whom it may concern:*

Be it known that I, WILLIAM A. BARR, a citizen of the United States, formerly a resident of Paeonian Springs, in the county of Loudoun and State of Virginia, but now residing at Washington, in the District of Columbia, have invented certain new and useful Improvements in Rubber Erasers, of which the following is a specification.

My invention more especially relates to that class of rubber erasers adapted to be used when worn on the finger in a manner similar to the setting of a ring. Such an eraser has heretofore been patented in the form of a simple rubber ring with the eraser integral therewith. A thimble with a rubber eraser inserted in its tip has also been patented.

The object of my invention is to provide an eraser the erasive material or erasing portion proper of which can readily be applied to or removed from its ring portion and yet be held securely in place while retaining other advantages incident to such ring-erasers—such, for instance, as being simple and inexpensive in construction, adapted to being carried by the finger, so as always to be ready for instant and convenient use when writing, drawing, &c., at the same time not interfering in any way with the free use of the finger on which it is worn, and avoiding the liability of the eraser being lost or mislaid. These and other advantages I attain by securing the erasive material or eraser proper to the ring, substantially in the manner hereinafter set forth.

Figure 1:
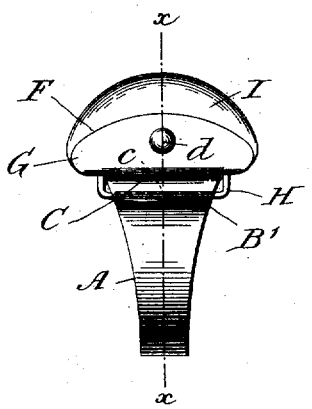
Figure 2:
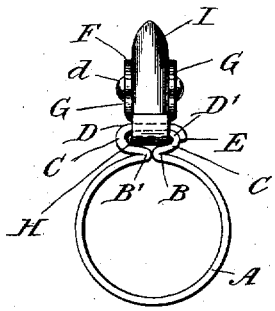
Figure 3:
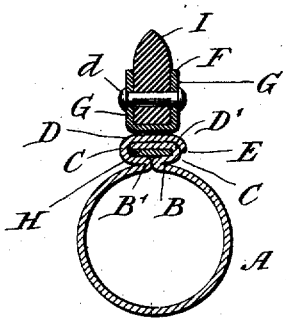

Referring to the accompanying drawings, which represent one convenient way of carrying out the object of my invention, Figure 1 is a side elevation of the eraser looking edgewise at the ring; Fig. 2, an end view thereof looking sidewise at the ring; Fig. 3, a vertical central section therethrough on the line *x x* of Fig. 1, and Fig. 4 a plan or top view of the blank from which the clamp or eraser-holder shown in the drawings is made as it appears before being bent into the shape shown in the other figures of the drawings.

The drawings show a ring A formed in any desired manner from sheet metal, celluloid, rubber, or other suitable material, the free ends B B′ of which ring are bent outward and then inward again to form shoulders C and overlapping ends D D′. One, D, of said overlapping ends is provided with a flange E, adapted to engage the shoulder on the opposite end D′ for the purpose of clamping these ends securely together.

Figure 4:
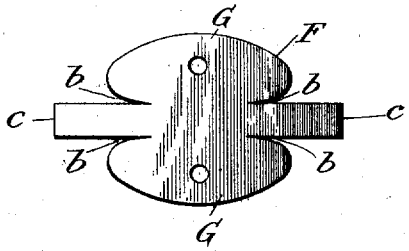

The clamp or holder F, preferably of material similar to that composing the ring, is shown as formed from a suitable blank, Fig. 4, by slitting it at the points *b*, bending the side portions G thereof up to form the sides, and bending the central end portions downward and then inward until the ends *c* thereof meet to form a loop H.

The holder F is shown as attached to the ring A by inserting the ends D D′ of the ring in the loop H of the holder and pressing the sides of the ring together until the flange E of the end D springs over the shoulder C on the opposite end D′, the holder being thus securely held by these interlocking or overlapping ends D D′.

If desired, the end D of the ring may be made longer than shown in the drawings and bent down after being inserted through the loop H of the holder F, so as to lap over the shoulder C, instead of having the flange E formed thereon before being inserted in the loop and sprung over the shoulder.

The rubber eraser or erasive material I is shown as inserted between the upturned sides G of the holder F and held therein by means of the rivet *d*, or it may be secured in any other suitable well-known way.

When the substitution of a new piece of erasive material for an old one is desired, it is only necessary, under the construction shown in the drawings, to disengage the flange E from the shoulder C, and then by expanding the ring its ends can be drawn out of the loop of the holder, the holder removed, and a new one, with its erasive material, substituted.

The rubber eraser or erasive material could obviously readily be removed or replaced by removing its rivet *d* or other fastening and then securing a new piece of rubber between the sides G and fastening it in place.

I do not wish to limit myself to the exact construction herein shown and described, as that may be modified in various ways within certain limits without departing from the spirit of my invention.

What I claim herein as new and as of my own invention is—

1. An eraser, adapted to be used when worn on the finger, comprising a ring provided with a holder, and having a piece of erasive material secured therein and projecting laterally therefrom, substantially as hereinbefore set forth.

2. An eraser, adapted to be used when worn on the finger, comprising a ring provided with a holder, and having a piece of erasive material, differing from the material of the ring, secured therein and projecting laterally therefrom, substantially as hereinbefore set forth.

3. An eraser, adapted to be used when worn on the finger, comprising a ring provided with a holder, and having a piece of erasive material secured therein by detachable fastenings and projecting laterally therefrom, substantially as hereinbefore set forth.

4. An eraser, adapted to be used when worn on the finger, comprising a ring provided with a holder, interlocking or overlapping devices on the ring and holder, and a piece of erasive material secured therein and projecting laterally therefrom, substantially as hereinbefore set forth.

5. An eraser, adapted to be used when worn on the finger, comprising a piece of erasive material, its holder having a loop, and a ring the free ends of which are adapted to engage said loop, substantially as hereinbefore set forth.

6. An eraser, adapted to be used when worn on the finger, comprising a piece of erasive material, its holder having a loop, and a ring provided with shoulders and overlapping ends; said ends being adapted to engage the loop on the holder, and one of these ends being provided with a flange adapted to engage the shoulder on the opposite end, substantially as hereinbefore set forth.

7. An eraser, adapted to be used when worn on the finger, comprising an eraser-holder having upturned sides, a piece of erasive material secured therein, a loop on the holder, and a ring the ends of which are adapted to engage said loop, substantially as hereinbefore set forth.

In testimony whereof I hereunto subscribe my name.

WILLIAM A. BARR.

Witnesses:
L. C. CONWELL,
C. W. BARTLETT.